(12) United States Patent
Martin et al.

(10) Patent No.: US 6,539,599 B2
(45) Date of Patent: Apr. 1, 2003

(54) DEVICE FOR ASSEMBLING A FLEXIBLE CONDUIT ELEMENT

(75) Inventors: Hans Peter Martin, Weingarten (DE); Marcel Le Foll, Pasly (FR)

(73) Assignee: IWKA Balg- und Kompensatoren-Technologie GmbH, Stutensee (DE)

(*) Notice: Subject to any disclaimer, the term of this patent is extended or adjusted under 35 U.S.C. 154(b) by 72 days.

(21) Appl. No.: 09/824,668

(22) Filed: Apr. 4, 2001

(65) Prior Publication Data
US 2001/0037548 A1 Nov. 8, 2001

Related U.S. Application Data

(63) Continuation-in-part of application No. 09/453,090, filed on Dec. 2, 1999, now abandoned.

(30) Foreign Application Priority Data

Dec. 8, 1998 (DE) .......................... 198 56 513

(51) Int. Cl.[7] ............................. B23B 31/40
(52) U.S. Cl. ...................... 29/235; 29/237; 29/252; 269/48.1
(58) Field of Search .................. 269/48.1, 37, 43; 279/209; 228/49.3, 44.5; 29/237, 235, 234, 252

(56) References Cited

U.S. PATENT DOCUMENTS

| | | | | |
|---|---|---|---|---|
| 2,523,519 A | * | 9/1950 | Reeves | 269/48.1 |
| 2,615,413 A | * | 10/1952 | Adams et al. | 269/48.1 |
| 4,045,038 A | * | 8/1977 | Obenshain | 269/48.1 |
| 4,659,126 A | * | 4/1987 | Breck et al. | 269/48.1 |
| 5,244,192 A | * | 9/1993 | Casad | 269/48.1 |

* cited by examiner

Primary Examiner—Robert C. Watson
(74) Attorney, Agent, or Firm—Paul Vincent

(57) ABSTRACT

A device for assembly of a flexible conduit element consisting essentially of a flexible ring-corrugated or helical-shaped bellows body which is displaced over an inner arbor in order to introduce a jacket into the corrugations of the bellows body, has an the inner arbor comprising actuating elements for engagement into the corrugations of the bellows body at an inner side thereof. The inner arbor has an axial length which can be adjusted.

10 Claims, 3 Drawing Sheets

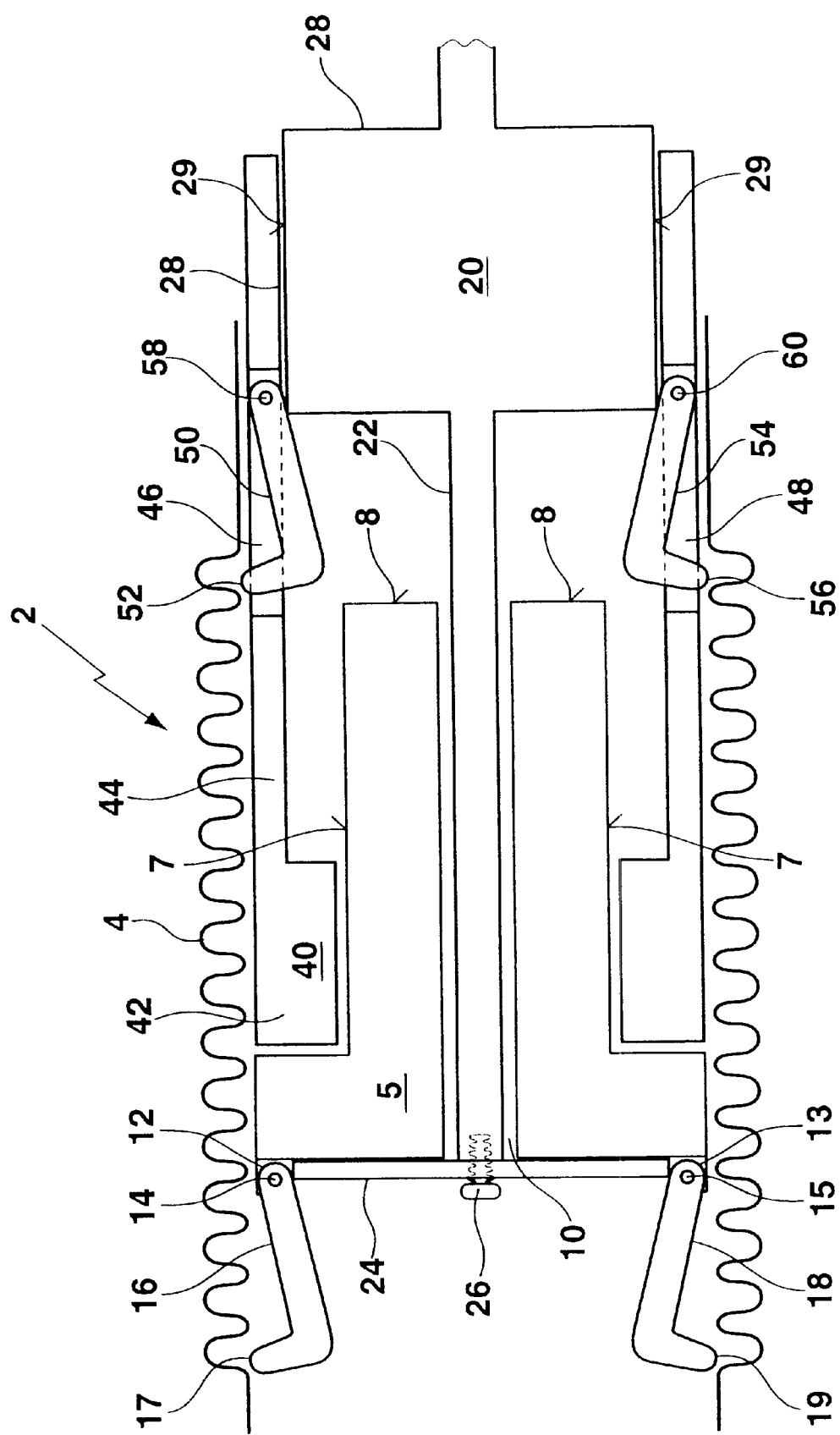

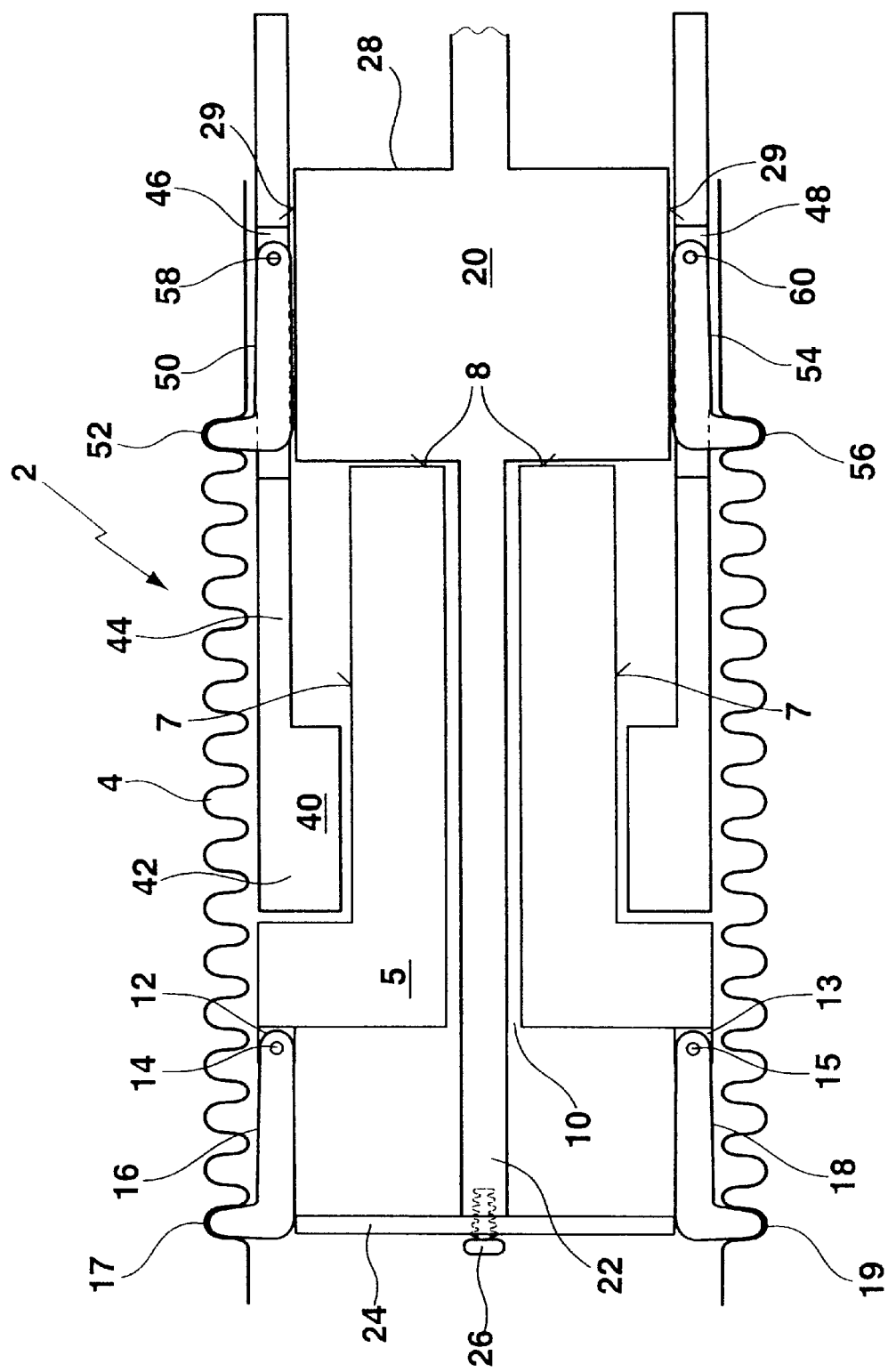

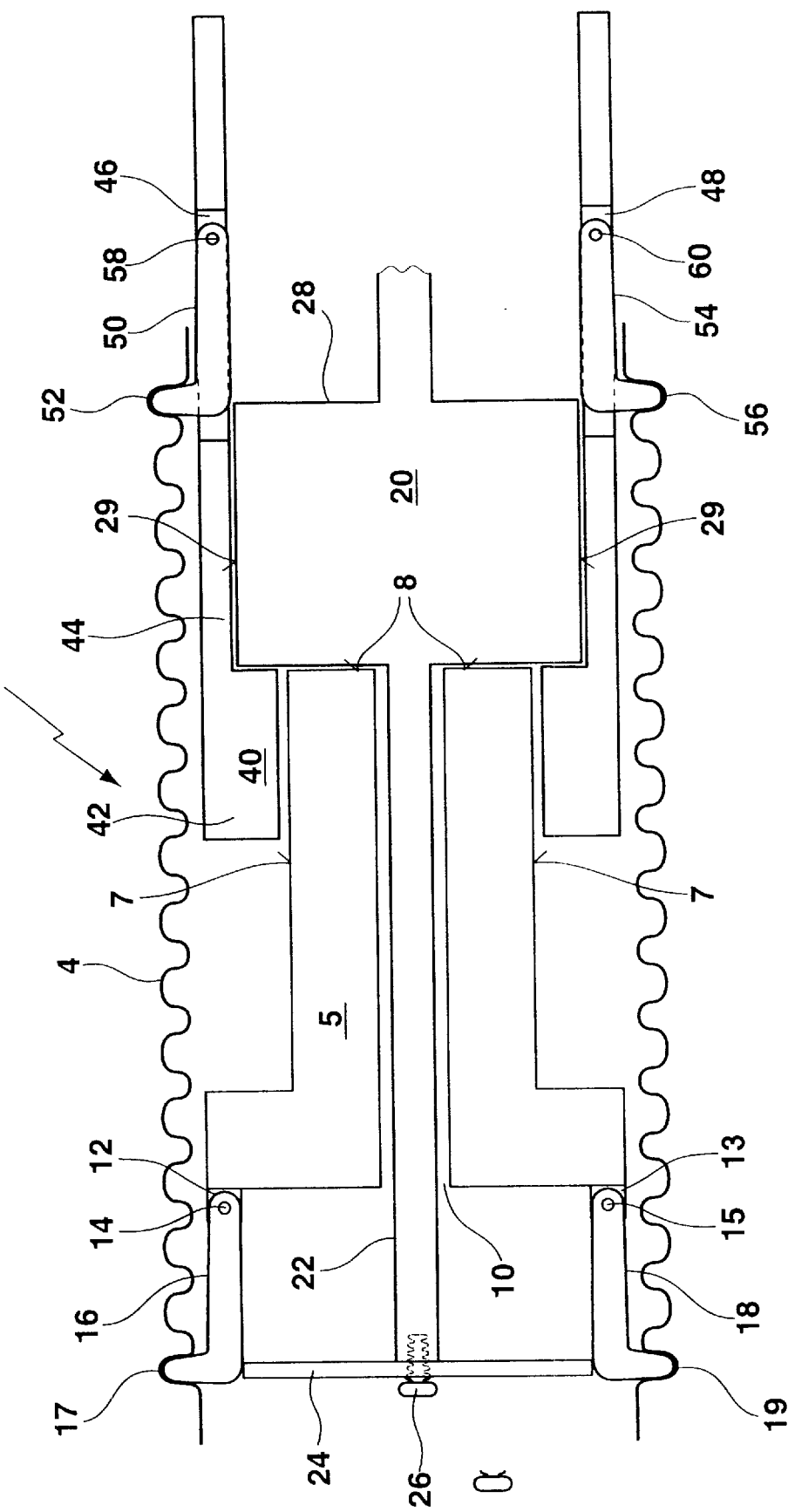

DEVICE FOR ASSEMBLING A FLEXIBLE CONDUIT ELEMENT

This application is a continuation-in part of Ser. No. 09/453,090 filed Dec. 2, 1999 now abandoned and claiming Paris Convention priority of DE 198 56 513.5 filed Dec. 8, 1998 the complete disclosure of which are hereby incorporated by reference.

BACKGROUND OF THE INVENTION

The invention concerns a device for assembly of a flexible conduit element comprising a flexible ring-corrugated or helical-shaped bellows member and a surrounding jacket cooperating therewith and having an inner arbor penetrating through the bellows member.

Devices of this type are used for the assembly of flexible conduit elements such as metallic exhaust tubes. These types of conventional conduit elements (U.S. Pat. No. 5,769,643, FR 2 685 435) primarily serve for the acceptance of vibrations to prevent their transmission from a rigid component to a neighboring component. The conduit elements thereby preferentially comprise a bellows member having a corrugated or helical structure and a jacket surrounding same made from a woven or knitted material which is captured by rings of the bellows member and which damps characteristic vibrations of the bellows member.

During conventional manufacture of an element of this type comprising a bellows body and an outer woven or knitted tube or conduit element, the latter had been displaced over the free bellows and fixed at the outside between the rings of the bellows body. The bellows body had been disposed on an inner arbor during this assembly procedure.

This procedure has the substantial disadvantage that attachment of the jacket to the bellows body is performed in an undefined fashion and substantial tolerance fluctuations in length can occur. The free disposition of the highly flexible bellows body on the inner arbor can preclude a defined cutting to length of the bellows body and essentially prevents a plane parallel cut when cutting to length.

DE 42 02 808 A1 discloses a flexible conduit element for exhaust conduits having a ring-corrugated or helical bellows and a metal tube disposed therein, the ends of which are connected with the ends of the bellows to connectors for the exhaust conduit. This product has been manufactured by initially cutting the bellows and the metallic tube to the desired length. The ends of the sectioned bellows or metal tube are provided with a support ring and the bellows and the metal tube are combined after disposition of a ring-shaped drive element on the ends. A conduit element of this kind, preassembled in this fashion, is placed in or on a magnetic coil for concentric centering of the bellows and metallic tube and, in order to bridge the separation between the bellows and the metallic tube, the metallic tube is widened against the inner wall of the outer support ring while the corrugations of the bellows are pushed together and the individual layers of the various components are pressed together and/or the corrugations of the bellows and the agraff structure of the metal tube are pressed together against the outer wall of the inner support ring or of a support arbor penetrating through the support ring. A pre-assembled conduit element is preferentially inserted into a magnetic pulse device and the differing components are pressed together by electrically conducting drive elements using the magnetic pulse procedure.

It is the underlying purpose of the invention to propose a device for the assembly of a flexible conduit element with which the above mentioned disadvantages are avoided.

SUMMARY OF THE INVENTION

This purpose is achieved in accordance with the invention in the device of the above mentioned kind in that the inner arbor has elements for engaging into the bellows body, wherein the length of the inner arbor can be adjusted. The elements of the inner arbor engaging into the bellows body thereby fix the location of the bellows body relative thereto i.e. to prevent displacement of the bellows body on the inner arbor during placement of the jacket. In addition, the inner arbor has a length which can be adjusted to thereby facilitate setting of the length of the bellows body to a predetermined preferred value.

In a preferred embodiment, the elements engage the corrugated portions of the bellows body at the ends thereof to thereby subject the individual corrugated sections to a substantially even tensile and compression forces so that the separation between the individual corrugations relative to each other remains substantially constant.

Advantageously, the elements for engagement into the end corrugations of the bellows body are pawls which engage in a positive connecting fashion into a corrugation of the bellows body with at least one outwardly projecting collar member to thereby serve as a holding or carrier element therein.

Advantageously, the pawls are borne for pivoting on the inner arbor so that they can be pivoted from an inactive position into an active position in cooperation with the spreading arbor and vice versa.

Further advantages and features of the invention can be extracted from the following description with reference to the drawing.

BRIEF DESCRIPTION OF THE DRAWING

FIG. 1 is a longitudinal section through a substantially cylindrical fixture in accordance with the invention, following initial insertion within a bellows;

FIG. 2 is a second section depicting the fixture of FIG. 1 in a second position in which pawls have been pivoted to engage into end portions of the bellows; and FIG. 3 is a third section through the fixture of FIGS. 1 and 2 in a third stage in which the bellows has been stretched through extension of the fixture.

DESCRIPTION OF THE PREFERRED EMBODIMENT

The device for assembling a flexible bellows conduit element comprises a fixture 2 for insertion within a bellows 4. The fixture 2 comprises an inner guide member 5 having a substantially cylindrical guide surface 7 and a plunger abutment surface 8. A central bore 10 penetrates through the inner guide member 5. A forward face of the inner guide member 5 has integral first and second guide protrusions 12 and 13, disposed proximate to an inner surface of the bellows 4. A first guide pawl 16 is mounted to the first guide protrusion 12 for rotation relative thereto to pivot in an outward direction towards the bellows 4. A first guide torsion spring 14 biases the pawl in a radially inward direction to assume the position shown in FIG. 1. The first guide pawl 16 has an end on which a first guide pawl nose 17 is disposed. In the embodiment of FIG. 1, a second guide pawl 18 is disposed diametrically across from the first guide pawl 16 and mounted for rotation to the second guide protrusion 13. A second guide torsion spring 15 biases the second guide pawl 18 in a radially inward direction to assume the position shown in FIG. 1. A second guide pawl nose 19 is disposed at the end of the second guide pawl 18 and is directed, as is the first guide pawl nose 17 of first guide pawl 16, in a substantially radially outward sense.

The fixture further comprises a plunger 20 having a plunger rod 22 extending in a forward direction to penetrate through the central bore 10 of the inner guide member 5. A forward portion of the plunger 20 is provided with a plunger disk 24 attached to the plunger rod 22 with suitable attachment means 26. The plunger disk 24 extends in a substantially radial direction to abut against radially inner surfaces of the first guide pawl 16 and of the second guide pawl 18 in the position shown in FIG. 1. The plunger 20 also has a plunger collar 28 positioned at a rear portion thereof and having a substantially cylindrical collar surface 29.

A cylindrical outer sleeve member 40 is disposed about the plunger 20 and the guide surface 7 of the inner guide member 5. The outer sleeve member 40 comprises an integral sleeve shoulder 42 disposed at a portion of the outer sleeve member 40 most proximate to the first 16 and second 18 guide pawls. A sleeve tube 44 extends from the sleeve shoulder 42 towards a rear direction and has an upwardly disposed first sleeve slot 46 and a diametrically positioned second sleeve slot 48. A first sleeve pawl 50 is mounted for rotation within the first sleeve slot 46 to pivot in a radially outward direction. The first sleeve pawl 50 has a first sleeve pawl nose 52 directed in a substantially outward sense. A diametrically opposed second sleeve pawl 54 is accommodated within the second sleeve slot 48 for pivoting in an outward direction. The second sleeve pawl 54 has a second sleeve pawl nose 56 pointing radially outward. First sleeve torsion spring 58 and second sleeve torsion spring 60 bias the first sleeve pawl 50 and second sleeve pawl 54, respectively, in an inward direction to assume the position shown in FIG. 1.

The function of the fixture in accordance with the invention will now be described in connection with FIGS. 1, 2 and 3. In an initial stage, the fixture 2 is prepared for insertion into the bellows 4 by detaching the plunger disc 24 from the plunger rod 22 through disengagement of disc attachment means 26. The outer sleeve member 40 is then displaced over the guide surface 7 of the inner guide member 5 to assume the position shown in FIG. 1. Subsequent thereto, the plunger 20 is inserted from the rear within the outer sleeve member 40 such that the plunger rod 22 penetrates through the central bore 10 of the inner guide member 5 to exit at the front portion thereof, as shown in FIG. 1. The plunger disc 24 is then reattached to the plunger rod 22 using disc attachment means 26. The completely assembled fixture is then inserted within the bellows 4 to assume the position illustrated in FIG. 1.

In a second stage, illustrated in FIG. 2, the plunger 20 is displaced in a forward direction until a front end of the plunger collar 28 abuts against the plunger abutment surface 8 of the inner guide member 5. As a result thereof, the plunger disc 24 is displaced in a forward direction to pivot the first guide pawl 16 and second guide pawl 18 in opposition to the biasing force of the first guide torsion spring 14 and the second guide torsion spring 15 and into the position shown in FIG. 2. The first guide pawl nose 17 and second guide pawl nose 19 are disposed within an end corrugation of the bellows 4 and captured therein. At the same time, the outer surface 29 of the plunger collar 28 engages the first sleeve pawl 50 and second sleeve pawl 54 causing them to pivot in opposition to the bias force of first sleeve torsion spring 58 and second sleeve torsion spring 60 to rotate through the first sleeve slot 46 and second sleeve slot 48 to assume the position shown in FIG. 2. The first sleeve pawl nose 52 and second sleeve pawl nose 56 thereby engage into end corrugations of the bellows 4. In the position shown in FIG. 2, the bellows is firmly captured at its forward and rear ends through the engagement of first guide pawl nose 17, second guide pawl nose 19, first sleeve pawl nose 52, and second sleeve pawl nose 56.

In a third stage of procedure in accordance with FIG. 3, the outer sleeve member 40 is displaced away from the first and second guide pawls 16 and 18 to slide along the guide surface 7 until the sleeve shoulder 42 abuts against a front surface of the plunger collar 28 diametrically proximate the plunger abutment surface 8. The collar surface 29 is dimensioned in such a fashion that contact is maintained between this surface 29 and the first sleeve pawl 50 as well as the second sleeve pawl 54 such that the first sleeve pawl nose 52 as well as the second sleeve pawl nose 56 remain engaged in end corrugations of the bellows 4. Since the relative position between the plunger 20 and the inner guide member 5 does not change during this latter procedure, the plunger disc 24 continues to displace the first guide pawl 16 and second guide pawl 18 such that the first and second guide pawl noses 17 and 19 remain engaged in end corrugations at the front portion of the bellows 4. This position can be maintained by using conventional clamping techniques active on portions of the outer sleeve member 40 extending beyond the bellows 4. The bellows 4 is thereby stretched in preparation for the introduction of a surrounding jacket made from a woven or knitted material (not shown in the figure).

Subsequent to application of the surrounding jacket, the steps described in connection with FIGS. 1, 2 and 3 are reversed such that the bellows 4 relaxes from the stretched position of FIG. 3 to the initial position shown in FIG. 1 to capture the corrugated or helical woven or knitted material of the jacket within the corrugations of the bellows 4.

LIST OF REFERENCE SYMBOLS 2 fixture
4 bellows
5 inner guide member
7 guide surface
8 plunger abutment surface
10 central bore
12 first guide protrusion
13 second guide protrusion
14 first guide torsion spring
15 second guide torsion spring
16 first guide pawl
17 first guide pawl nose
18 second guide pawl
19 second guide pawl nose
20 plunger
22 plunger rod
24 plunger disc
26 disc attachment
28 plunger collar
29 collar surface
40 outer sleeve member
42 sleeve shoulder
44 sleeve tube
46 first sleeve slot
48 second sleeve slot
50 first sleeve pawl
52 first sleeve pawl nose
54 second sleeve pawl 56 second sleeve pawl nose
58 first sleeve torsion spring
60 second sleeve torsion spring

We claim:

1. A device for assembling a flexible conduit element, the conduit element having a ring-corrugated or helical-shaped bellows body and a jacket cooperating with the bellows body, the device comprising:

a fixture for insertion within the bellows body, said fixture having means for adjusting a length thereof; and actuating elements mounted to said fixture for engagement with the bellows body, wherein said actuating elements are disposed for engagement in corrugations at ends of the bellows body.

2. The device of claim 1, wherein said actuating elements comprise pawls, said pawls engaging into the end corrugations of the bellows body.

3. The device of claim 2, wherein said pawls are disposed on said fixture for pivoting.

4. The device of claim 3, wherein said fixture comprises a first member and a second member, and wherein said length adjusting means comprise means for displacing said first member relative to said second member.

5. The device of claim 4, wherein said fixture has means cooperating with said pawls to pivot said pawls in dependence on a direction of motion of said cooperating means.

6. The device of claim 5, wherein said first member comprises means for pivoted mounting of a first pawl pair and resilient means for biasing said first pawl pair in an inward direction.

7. The device of claim 6, wherein said first member has a central bore and wherein said cooperating means comprises a plunger extending through said bore, said plunger having an integral forward plate member cooperating with said first pawl pair to pivot said first pawl pair into engagement with the bellows when said plunger is displaced in a forward direction through said bore.

8. The device of claim 7, wherein said second member comprise an outer sleeve dimensioned for displacement along an outer surface of said first member, said outer sleeve having slots for accepting a second pawl pair, said second pawl pair mounted for pivoting in a radial direction though said slots, said outer sleeve also comprising spring means for biasing said second pawl pair in a radially inward direction.

9. The device of claim 8, wherein said plunger comprises a rear collar having an outer surface cooperating with said second pawl pair to pivot said second pawl pair radially for engaging said bellows.

10. The device of claim 9, wherein said outer sleeve, said outer surface of said first member and said outer surface of said rear collar are dimensioned to maintain engagement of said first and said second pawl pairs within the bellows when said outer sleeve is displaced in a rear direction along a defined length relative to said first member and said plunger.

* * * * *